(12) United States Patent
Kanehisa et al.

(10) Patent No.: US 6,523,659 B2
(45) Date of Patent: Feb. 25, 2003

(54) BICYCLE HUB WITH TIGHT CONNECTION RATCHET AND DETACHABLE FREEWHEEL

(75) Inventors: Takanori Kanehisa, Osaka (JP); Kanji Kirimoto, Kaizuka (JP)

(73) Assignee: Shimano Inc., Osaka (JP)

(*) Notice: Subject to any disclaimer, the term of this patent is extended or adjusted under 35 U.S.C. 154(b) by 0 days.

(21) Appl. No.: 09/732,922

(22) Filed: Dec. 11, 2000

(65) Prior Publication Data

US 2002/0072446 A1 Jun. 13, 2002

(51) Int. Cl.$^7$ ................................................ B62K 25/02
(52) U.S. Cl. ........................................ 192/64; 301/110.5
(58) Field of Search ........................... 192/64, 48.6, 108, 192/114 T; 301/110.5; 403/1, 11, 16, 21

(56) References Cited

U.S. PATENT DOCUMENTS

| | | | |
|---|---|---|---|
| 1,597,198 A | * 8/1926 | Howell | |
| 2,361,706 A | * 10/1944 | Pavlecka et al. | 403/21 |
| 2,951,570 A | * 9/1960 | Antrim et al. | 192/48.6 |
| 4,461,375 A | * 7/1984 | Brown | 192/64 |
| 4,472,163 A | * 9/1984 | Bottini | 192/64 |
| 4,895,469 A | * 1/1990 | Coueron | 403/21 |
| 5,154,559 A | * 10/1992 | Wagner | 403/21 |
| 5,494,390 A | 2/1996 | Gonzales | 411/368 |
| 5,515,957 A | * 5/1996 | McConaghy | 192/64 |
| 6,059,305 A | * 5/2000 | Bollini | 280/281.1 |
| 6,065,580 A | * 5/2000 | Kirk | 192/64 |

FOREIGN PATENT DOCUMENTS

| | | | |
|---|---|---|---|
| DE | 1155355 | | 4/1964 |
| DE | 9218358 | | 3/1994 |
| EP | 94649 | | 11/1983 |
| EP | 0 522 983 a1 | * | 1/1993 |
| EP | 890505 | | 1/1999 |
| EP | 8351888 | | 9/1999 |
| FR | 1093378 | | 5/1955 |
| FR | 2188551 | | 1/1974 |
| FR | 2501124 | | 9/1982 |
| FR | 2776612 | | 10/1999 |
| GB | 572237 | | 9/1945 |
| GB | 668943 | | 3/1952 |
| IT | 596057 | | 7/1959 |
| JP | 5551601 | | 4/1980 |

* cited by examiner

Primary Examiner—Rodney H. Bonck
(74) Attorney, Agent, or Firm—Shinjyu Global IP Counselors, LLP

(57) ABSTRACT

A bicycle hub includes a hub axle, a hub body and a sprocket support member. The hub axle has first and second portions releasably coupled together. The hub body has an outer tubular portion, a first engagement portion coupled to the outertubular portion and an interior passageway. The first portion of the hub axle is rotatably supported in the interior passageway. The first engagement portion is formed with a first meshing surface. The sprocket support member is mounted on the second portion of the hub axle and has a second engagement portion formed with a second meshing surface non-rotatably engaged with the first meshing surface. The first and second meshing surfaces are so dimensioned to overlap to prevent axial separation without relative rotation occurring between the first and second engagement portions.

34 Claims, 9 Drawing Sheets

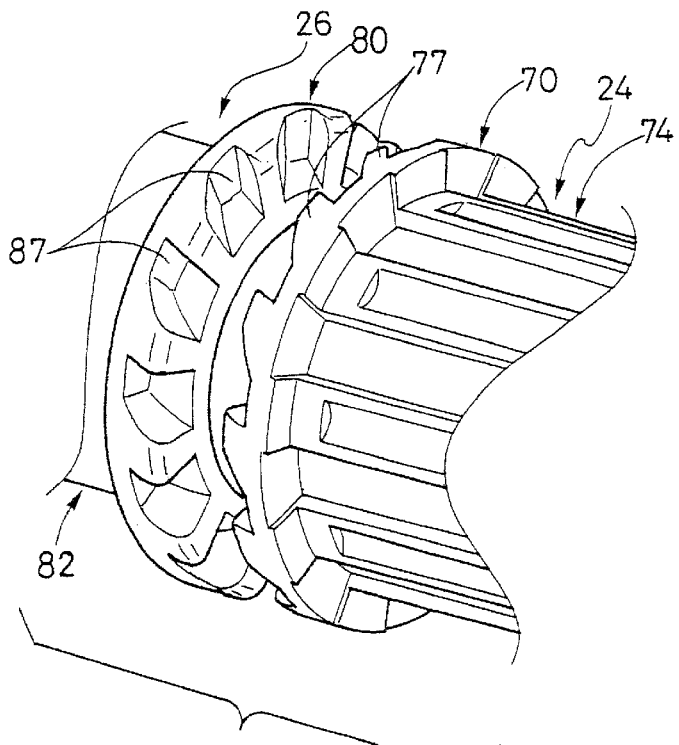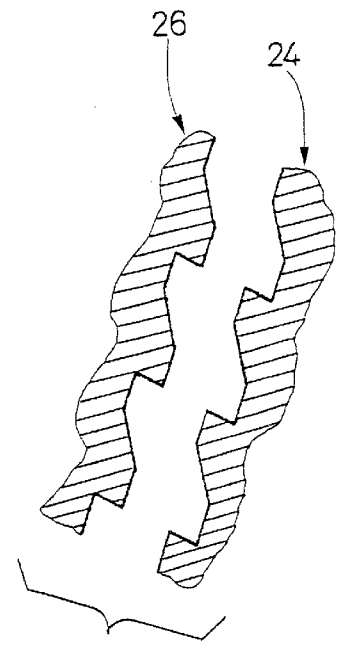
FIG. 13     FIG. 14
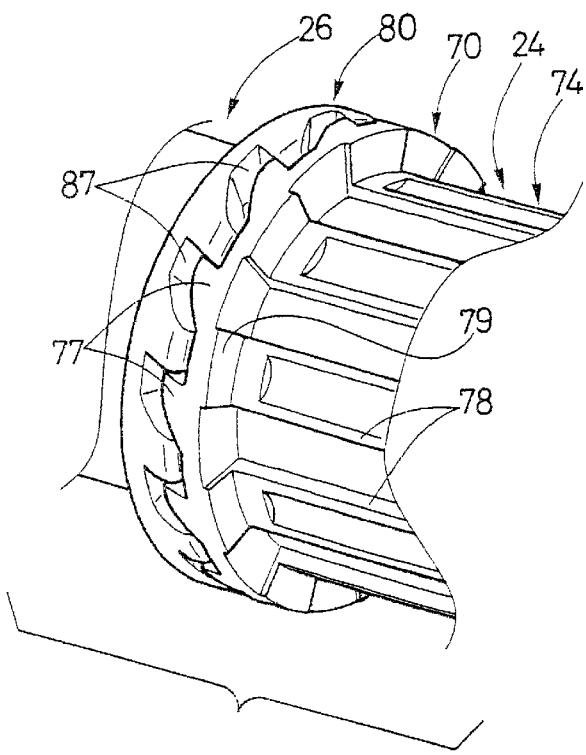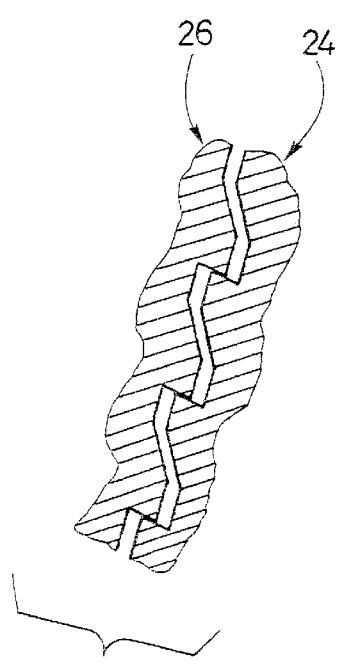
FIG. 15     FIG. 16

BICYCLE HUB WITH TIGHT CONNECTION RATCHET AND DETACHABLE FREEWHEEL

BACKGROUND OF THE INVENTION

1. Field of the Invention

This invention generally relates to a bicycle hub with a detachable freewheel. More specifically, the present invention relates a bicycle hub with a tight connection ratchet between the hub body and sprocket support member, which allows separation of the hub body from the sprocket support member.

2. Background Information

Bicycling is becoming an increasingly popular form of recreation as well as a means of transportation. Moreover, bicycling has become a very popular competitive sport. Whether the bicycle is used for recreation, transportation or competition, the bicycle industry is constantly improving their components. One particular component of the bicycle which has been extensively redesigned over the past years is the freewheel of the rear bicycle hub.

Specifically, most bicycles have several speeds. One popular form of drive train for a bicycle includes utilizing a plurality of sprockets that are mounted on the hub of the rear bicycle wheel. During pedaling, the bicycle chain engages one of the rear sprockets to rotate the rear wheel. When bicycle rider stops pedaling, the rear wheel should be able to continue to rotate while the sprockets remain stationary. Accordingly, the rear hub is provided with a freewheel that has a one-way clutch.

With an increased number of speeds provided by a derailleur of a bicycle today, a multi-step sprocket wheel unit for the rear wheel includes an increased number of sprockets which is now five to seven. There are demands for a simplified mounting structure and easy mounting method.

Freewheels used to transmit a driving force to the rear bicycle wheel in one rotation direction only are usually mounted on the rear hub of a bicycle. Freewheels are used so that the bicycle can advance freely without any rotation of the pedals. Freewheels include boss type freewheels which are mounted on the boss of the rear hub by being screwed onto the rear hub, and freehub type freewheels which are fastened to the rear hub as integral parts of the rear hub. Both types of freewheels are equipped with an outer tubular part, an inner tubular part which is installed radially inwardly of the outer tubular part so that the inner tubular part is free to rotate relative to the outer cylinder part, and a one-way clutch which is installed between the outer tubular part and inner tubular part for transmitting the driving force from the outer tubular part to the inner tubular part in one rotational direction only. The outer tubular part has a plurality of gears mounted thereon, while the inner tubular part is, usually mounted on the rear hub of the bicycle.

Splines are formed between the sprocket wheels and boss to prohibit relative rotation therebetween positively. Since this unit is used for the rear wheel of a bicycle, drive must be transmitted between the rear wheel axle and boss through a one-way mechanism. For this purpose, the boss is formed as an outer race of a one-way clutch, and the one-way clutch and inner race are disposed on an inner periphery of the boss.

As the number of rear gears or sprockets have increased over the years, the freewheel has become larger and heavier. Moreover, with the increased number of gears or sprockets, a wider range of torque is being applied from the sprockets to the freewheel.

In view of the above, there exists a need for a bicycle hub with a detachable freewheel which overcomes the above mentioned problems in the prior art. This invention addresses this need in the prior art as well as other needs, which will become apparent to those skilled in the art from this disclosure.

SUMMARY OF THE INVENTION

One object of the present invention is to provide a bicycle hub with a tight connection ratchet that has a simplified structure.

Another object of the present invention is to provide a bicycle hub with a tight connection ratchet that allows simplified mounting.

Another object of the present invention is to provide a bicycle hub with a tight connection ratchet for detaching a hub body from a sprocket support member that is relatively simple and inexpensive to manufacture and assemble.

The foregoing objects can basically be attained by providing a bicycle hub, comprising a hub axle, a hub body and a sprocket support member. The hub axle has a first portion and a second portion releasably coupled to the first portion. The hub body has an outer tubular portion, a first engagement portion coupled to the outer tubular portion and an interior passageway. The first portion of the hub axle is rotatably supported in the interior passageway. The first engagement portion is formed with a first meshing surface. The sprocket support member is mounted on the second portion of the hub axle and has a second engagement portion formed with a second meshing surface non-rotatably engaged with the first meshing surface. The first and second meshing surfaces are so dimensioned to overlap to prevent axial separation without relative rotation occurring between the first and second engagement portions.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 13 is an enlarged, partial perspective view of the engagement member and sprocket support member illustrated in FIGS. 2–12 prior to engagement between the sprocket support member and the engagement member;

FIG. 14 is a diagrammatic cross-sectional view of the projections and recesses of the sprocket support member and engagement member illustrated in FIG. 13;

FIG. 15 is an enlarged, partial perspective view of the sprocket support member and engagement member illustrated in FIGS. 2–12 showing an intermediate engagement position;

FIG. 16 is a diagrammatic cross-sectional view of the projections and recesses of the sprocket support member and engagement member illustrated in FIG. 15;

DETAILED DESCRIPTION OF THE PREFERRED EMBODIMENTS

Figure 1:
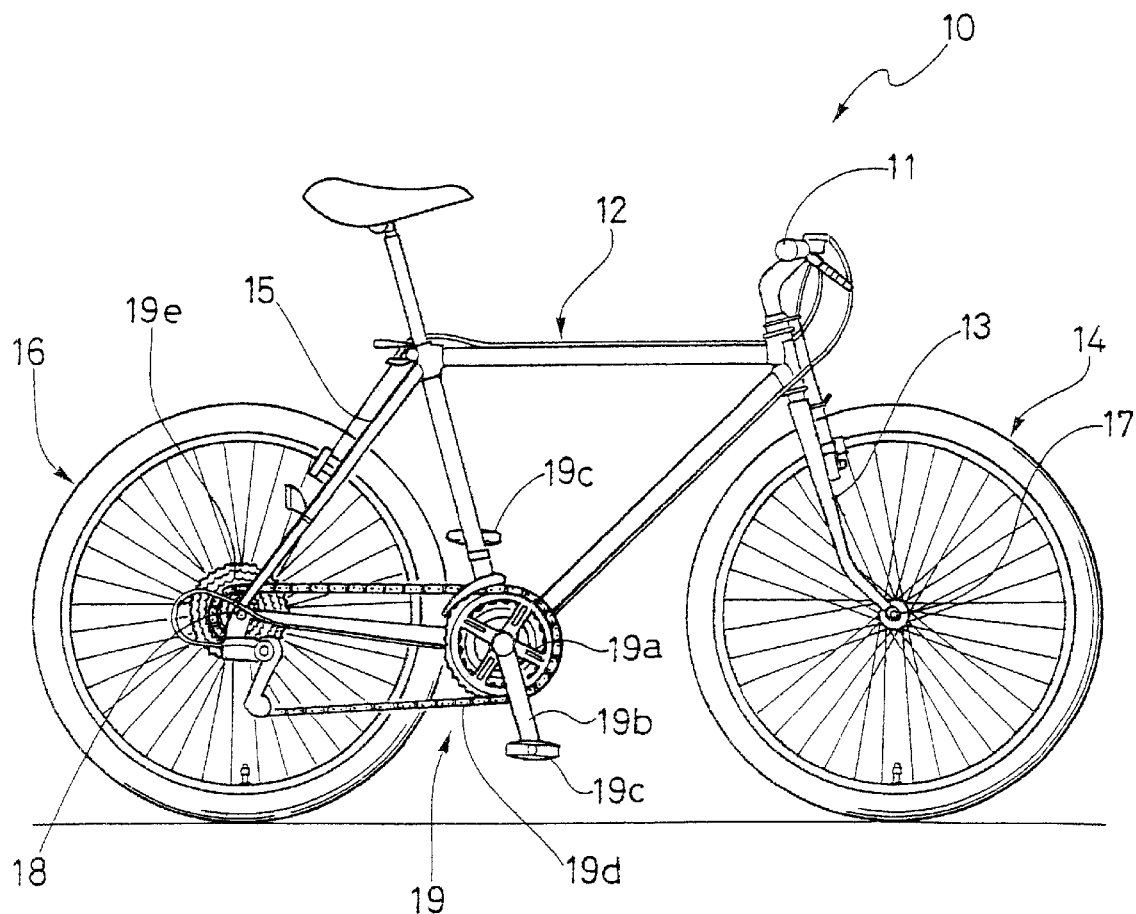
FIG. 1 is a side elevational view of a conventional bicycle with a rear hub in accordance with the present invention.

Referring initially to FIG. 1, a bicycle 10 is illustrated with a rear hub in accordance with the present invention installed thereon as discussed below. Bicycle 10 has a frame 12 with a front fork 13 movably coupled thereto and a rear fork 15 fixedly coupled thereto. A rear wheel 16 is rotatably coupled to rear fork 15 via a rear hub 18. A front wheel 14 is rotatably coupled to front fork 13 via a front hub 17. A seat is adjustably coupled to frame 12 and a handlebar 11 is coupled to front fork 13 for turning front wheel 14. A drive train 19 is coupled to frame 12 for propelling bicycle 10. Drive train 19 basically includes a front set of sprockets 19a, a pair of crank arms 19b with pedals 19c, a drive chain 19d and a set of rear sprockets 19e. Front sprockets 19a are rotatably coupled to frame 12 via a bottom bracket (not shown). Rear sprockets 19e are coupled to rear hub 18 of rear wheel 16 in a relatively conventional manner.

Since the various components of bicycle 10 are well known in the art, these parts will not be discussed or illustrated in detail herein, except as they are modified in accordance with the present invention. More specifically, components of bicycle 10 will not be discussed or illustrated herein, except as they relate to rear hub 18. Moreover, it will be apparent to those skilled in the art from this disclosure that various conventional bicycle parts such as brakes, derailleurs, additional sprockets, etc., which are not illustrated and/or discussed herein, can be used in conjunction with the present invention.

Referring now to FIGS. 2–6, rear hub 18 basically includes a hub axle 20, a hub body 22, and a sprocket support member 24. Hub axle 20 is rotatably supported within an interior passageway of hub body 22 and extends axially from both ends of hub body 22. Hub body 22 has an engagement member 26 (i.e. an engagement portion) coupled thereto. The engagement member is non-rotatably coupled to sprocket support member 24 when rear hub 18 is assembled. Hub axle 20 is preferably formed of two parts releasably coupled together so hub body 22 can be separated from sprocket support member 24. Engagement member 26 is preferably coupled to hub body 22 via a one way clutch such that engagement member 26 is freely rotatable relative to hub body 22 in only one direction. Hub body 22 rotates with engagement member 26 when engagement member 26 is rotated in the opposite direction.

Hub body 22 is preferably mounted on one part of hub axle 20 while sprocket support member 24 is preferably freely rotatably mounted on the other part of hub axle 20. The two parts of hub axle 20 are preferably threadedly coupled together to allow release of sprocket support member 24 from hub body 22 without removing sprocket support member 24 from rear fork 15. In the illustrated embodiment, the sprocket support member 24, engagement member 26, and a one-way clutch 28 form parts of the freewheel. Of course, it will be apparent to those skilled in the art from this disclosure that the present invention can be used with hubs that do not include a one way clutch (i.e. freewheel) if needed and/or desired. Moreover, the term "sprocket support member" is used herein to refer to a portion of the hub that has at least one sprocket directly or indirectly supported thereon.

Referring still to FIGS. 2–6, hub axle 20 basically includes a first portion 30 and a second portion 32 threadedly coupled to first portion 30 via a threaded connection. Preferably, first portion 30 is rotatably supported within an interior passageway of hub body 22 and sprocket support member 24 is mounted on second portion 32 of hub axle 20. Moreover, first portion 30 is preferably threadedly coupled to second portion 32 such that first portion 30 can be separated from second portion 32. Preferably, hub axle 20 has a diameter large enough to provide enough strength for separable hub axle 20.

First portion 30 of hub axle 20 is preferably an elongate cylindrical member formed of lightweight, rigid metallic material, such as cast aluminum, titanium, or steel. Of course, first portion 30 could be constructed of any suitable material as needed and/or desired. Moreover, first portion 30 preferably has a substantially constant, circular cross-section. First portion 30 of hub axle 20 basically includes a first end section 34, a second end section 36 axially spaced from first end section 34 and a central section 38 extending between first end section 34 and second end section 36.

First end section 34 is preferably provided with external clockwise threads for releasably coupling first portion 30 to second portion 32. Moreover, first end section 34 preferably has a retaining ring 31 releasably mounted thereon in a conventional manner adjacent central section 38. Retaining ring 31 is mounted on first portion 30 after first portion 30 is mounted within hub body 22 such that first portion 32 is retained within the interior passageway of hub body. Retaining ring 31 is preferably either an internally threaded ring member or a C-clamp. Of course, retaining ring 31 can have various configurations as needed and/or desired.

Second end section 36 is configured such that second end section 36 can be provided with a quick release mechanism 37 coupled thereto in a conventional manner. Thus quick release mechanism 37 is used to couple one side of the rear hub 18 to the rear fork 15 in a relatively conventional manner as discussed in more detail below.

Central section 38 is a cylindrical rod-shaped section extending between first end section 34 and second end section 36. Central section 38 of hub axle 20 is sized and configured to be slidably and freely rotatably received within a portion of hub body 22 in a relatively conventional manner.

Figure 5:
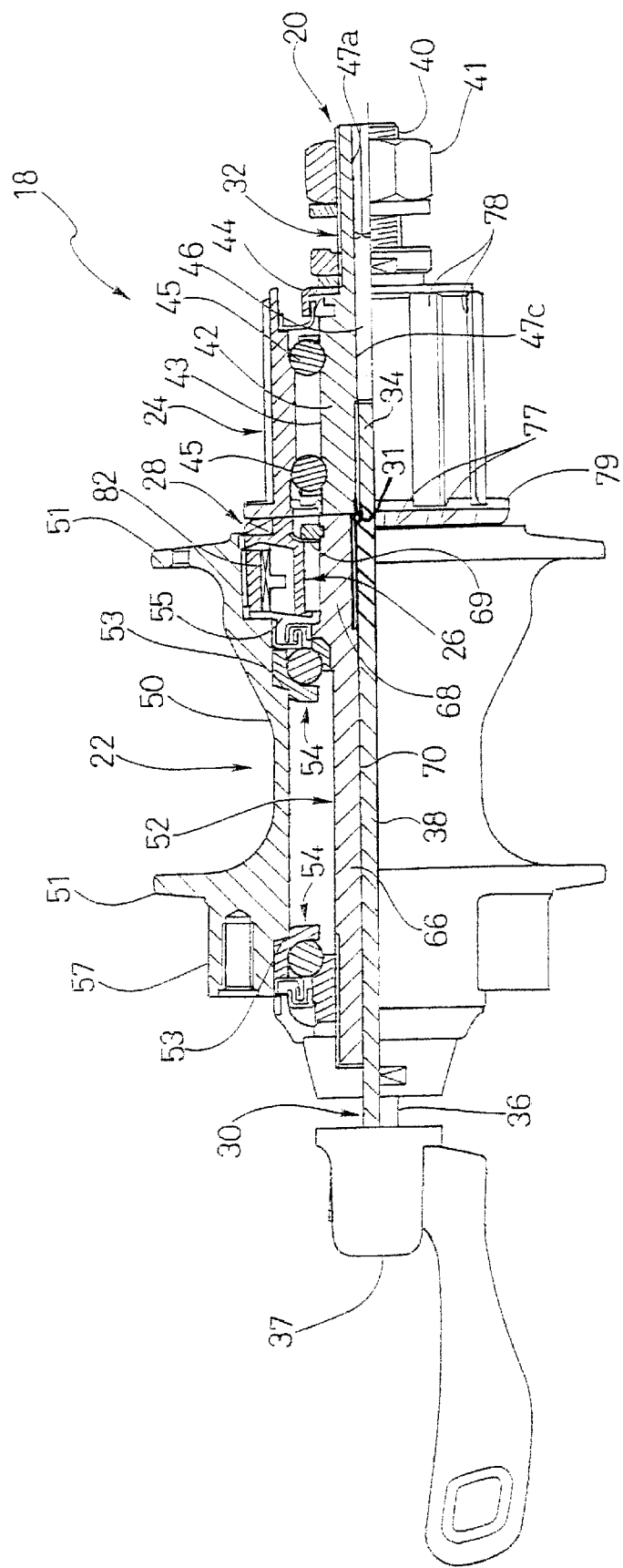
FIG. 5 is an enlarged, partial cross-sectional view of the assembled rear hub illustrated in FIGS. 1–4.
Figure 6:
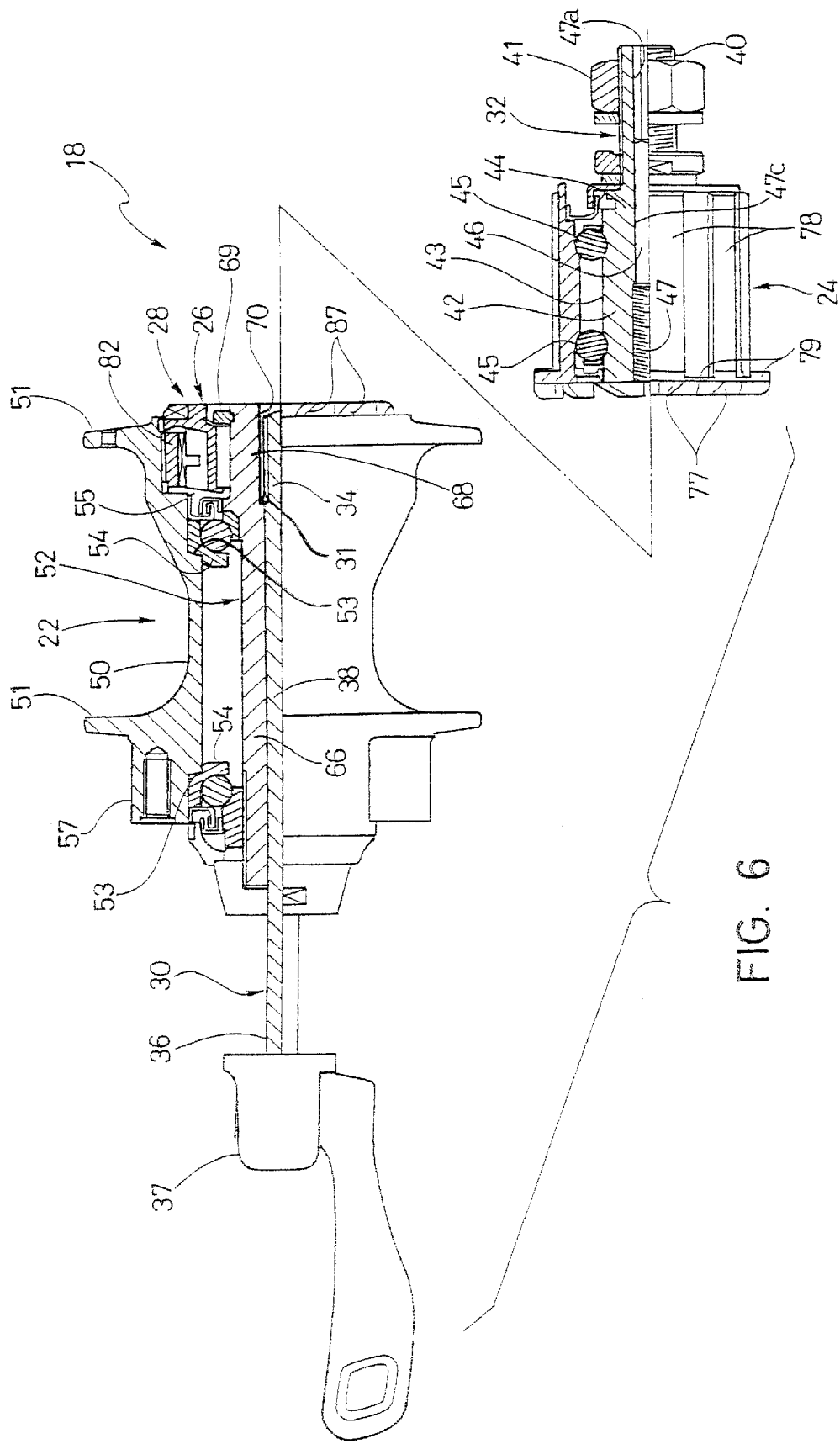
FIG. 6 is a partial cross-sectional view of the rear hub illustrated in FIGS. 1–5 with the sprocket support member detached from the hub body.
Figure 7:
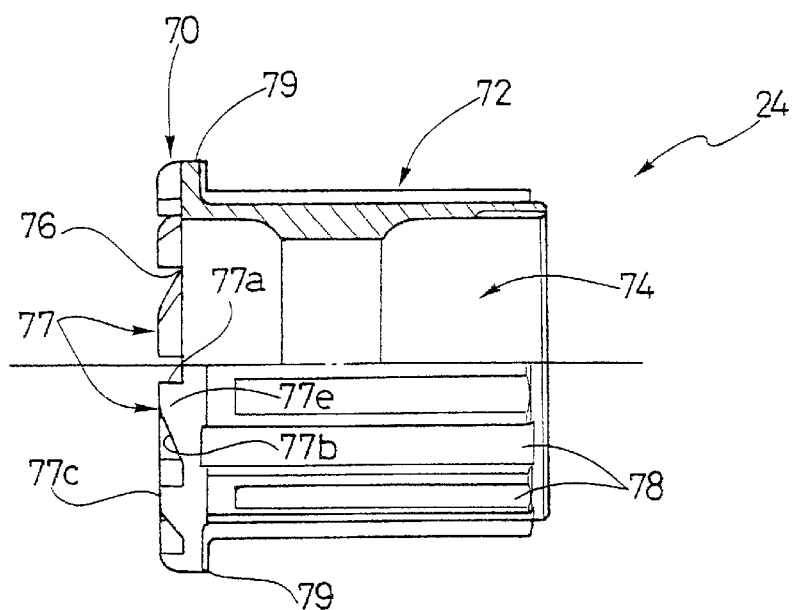
FIG. 7 is an enlarged, partial cross-sectional view of the sprocket support member illustrated in FIGS. 2–6.

Preferably, second portion 32 of hub axle 20 is a step-shaped cylindrical member having a varying cross-section for supporting sprocket support member 24, as best seen in FIGS. 5 and 6. Moreover, second portion 32 preferably has a minimum diameter to provide adequate strength for separable hub axle 20 and is preferably formed of lightweight, rigid metallic material, such as cast aluminum, titanium, or steel. Of course, second portion 32 could be constructed of any suitable material as needed and/or desired. Second portion 32 basically includes a first end section 40, a second end section 42 axially spaced from first end section 40, a central stepped section 44 extending between first end section 40 and second end section 42 and a through bore 46 extending through second portion 32.

First end section 40 is preferably provided with external threads for receiving a nut 41. Nut 41 is threadedly coupled to first end section 40 for coupling one side of rear hub 18 to rear fork 15 in a relatively conventional manner. Moreover, first end section 40 preferably has the smaller or minimum external diameter of second portion 32 and second end section 42 has the larger external diameter of second portion 32.

Second end section 42 has an external surface 43 sized and configured such that sprocket support member 24 can be freely rotatably mounted thereon. More specifically, external surface 43 includes a pair of annular, curved bearing recesses configured to receive a plurality of ball bearings or spherical balls 45 in order to freely rotatably mount sprocket support member 24 on second portion 32 of hub axle 20 in a conventional manner.

Through bore 46 basically includes an end section 47a, a threaded section 47b and a cylindrical center section 47c extending between end section 47a and threaded section 47b. End section 47a of through bore 46 is located within first end section 40 and preferably has a hexagonal cross-section for non-rotatably receiving conventional hexagonal wrench. Thus, second portion 32 of hub axle 20 can be prevented from rotating by inserting a hexagonal wrench into end section 47a. Threaded section 47b is located within second end section 42 of second portion 32 of hub axle 20. Threaded section 47b is sized and configured to threadedly receive threaded first end section 34 of first portion 30 such that first and second portions 30 and 32 of hub axle 20 can be threadedly coupled together. Accordingly, when first portion 30 is threadedly coupled to second portion 32, first and second portions 30 and 32 act as a single axle member of rear hub 18.

Referring still to FIGS. 2–6, hub body 22 basically includes an outer tubular portion 50, a tubular inner sleeve portion 52 and a pair of bearing assemblies 54 rotatably coupling inner sleeve portion 52 and outer tubular portion 50 together in a freely rotatable manner. First portion 30 of hub axle 20 is preferably rotatably supported within inner sleeve portion 52 within the interior passageway of outer tubular portion 50. Hub body 22 also preferably includes the one way clutch and an engagement portion as will be discussed in more detail below.

Outer tubular portion 50 is a tubular member with varying internal and external circular cross-sections, as best seen in FIGS. 5 and 6. Moreover, outer tubular portion 50 is preferably formed of lightweight, rigid metallic material, such as cast aluminum, titanium, or steel. Of course, outer tubular portion 50 could be constructed of any suitable material as needed and/or desired. Outer tubular portion 50 includes a pair of annular spoke mounting flanges 51 axially spaced from each other for coupling hub body 22 to the rim of wheel 16 in a conventional manner. Spoke mounting flanges 51 extend from opposite ends of outer tubular portion 50 and are adjacent free ends of outer tubular portion 50. A plurality of spokes are coupled to mounting flanges 51 to secure hub body 22 to wheel 16 in a conventional manner.

Outer tubular portion 50 also preferably includes a pair of abutment surfaces or abutment shoulders 53 facing in opposite directions for securing bearing assemblies 54 against longitudinal movement (i.e. axial) movement towards each other. Outer tubular portion 50 also preferably includes a recess 55 at one end and a brake disc mounting portion 57 at the opposite end. Recess 55 is preferably a threaded recess with clockwise internal threads sized and configured to receive a portion of the one-way clutch 28 therein. Brake disc mounting portion 57 preferably has a plurality of threaded attachment holes for coupling a brake disc (not shown) thereto in a conventional manner. Of course it will be apparent to those skilled in the art from this disclosure that hub 18 could be designed for use with conventional rim brakes as need and/or desired. For example, brake disc mounting portion 57 could be eliminated (i.e. the threaded mounting holes could be eliminated and the shape of outer tubular portion 50 could be modified).

Recess 55 is preferably a stepped recess with internal threads for receiving part of one-way clutch 28. The outer tubular portion is coupled to engagement member 26 via one-way clutch 28 in a relatively conventional manner, as will be discussed in more detail below. Thus, engagement member 26 is preferably freely rotatable in a first rotational direction relative to outer tubular portion 50, and engages outer tubular portion 50 to rotate with outer tubular portion 50 in the second rotational direction via one-way clutch 28, as will also be discussed in more detail below.

Bearing assemblies 54 are relatively conventional, and basically each include an inner race, a plurality of bearings or spherical steel balls and an outer race. Each outer race contacts an internal surface of outer tubular portion 50 and an abutment shoulder 53 of outer tubular portion 50 to secure bearing assemblies 54 against axial movement, as discussed above. Each inner race preferably contacts an external surface of inner sleeve portion 52 such that inner sleeve portion 52 is freely rotatable relative to outer tubular portion 50.

Referring still to FIGS. 2–6, inner sleeve portion 52 is preferably an elongated tubular member with a step shaped circular cross-section as best seen in FIGS. 5 and 6. Additionally, inner sleeve portion 52 is preferably formed of lightweight, rigid metallic material, such as cast aluminum, titanium or steel. Of course, inner sleeve portion 52 could be constructed of any suitable material as needed and/or desired. Inner sleeve portion 52 basically includes a tubular supporting section 66, a stepped tubular end section 68 (or enlarged tubular section) extending from supporting section 66 and a through bore 70 extending through supporting section 66 and stepped section 68.

Supporting section 66 of inner sleeve portion 52 has a partially threaded external surface configured to support bearing assemblies 54 such that outer tubular portion 50 is freely rotatable relative to inner sleeve portion 52. Stepped tubular section 68 is sized and configured to retain one of the bearing assemblies 54 against axial movement. Moreover, stepped tubular section 68 has an external surface configured such that engagement member 26 is freely rotatable about inner sleeve portion 52 and axially retained in recess 55 of hub body 22. More specifically, stepped section 68 preferably has an external diameter smaller than the internal diameter of engagement member 26. Moreover, stepped section 68 is sized and configured such that a clutch retaining member 69 can be coupled thereto to prevent removal of one-way clutch 28 from recess 55.

Through bore 70 includes a recessed section adjacent second portion 32 of hub axle 20 when rear hub 18 is assembled. The recessed section of through bore 70 allows threaded first end section 34 (with retaining ring 31 mounted thereon) of first portion 30 to be retracted within through bore 70 so that hub body 22 can be removed from sprocket support member 24. The recessed section of through bore 70 forms an internal abutment shoulder that prevents removal of first portion 30 with retaining ring 31. Through bore 70 of inner sleeve portion 50 is preferably a cylindrical through bore slightly larger than the diameter of first portion 30 of hub axle 20 such that first portion 30 is freely rotatable and slidable within through bore 70 for a limited range of axial movement. Thus threaded first end section 34 of first portion 30 can be retracted into through bore 70.

Referring now to FIGS. 2–9, sprocket support member 24 will now be discussed in more detail. Sprocket support member 24 is preferably formed as a one-piece, unitary member constructed of a substantially hard, rigid material. For example, sprocket support member 24 can be constructed of a lightweight metallic material such as aluminum or titanium or a slightly heavier material such as steel. Sprocket support member 24 is a tubular member and basically includes an engagement portion 70, a sprocket supporting section 72 and through bore 74 extending axially therethrough.

In the preferred embodiment, sprocket support member 24 has seven sprockets 19e non-rotatably mounted to the external surface of sprocket support member 24. The spacing between sprockets 19e are maintained by a plurality of spacers in a conventional manner. Of course, it will be apparent to those skilled in the art from this disclosure that sprocket support member 24 could have more/fewer sprockets 19e mounted thereon as needed and/or desired. In any case, sprocket support member 24 has at least one sprocket directly or indirectly supported thereon.

Engagement portion 70 includes an annular axially facing surface 76 and a plurality of axially facing projections 77 extending from axially facing surface 76. Sprocket supporting section 72 includes a plurality of axial splines 78 extending around its periphery for non-rotatably securing sprockets 19e thereon in a conventional manner. Each of the splines 78 has an abutment stopper 79 extending radially outwardly therefrom. The abutment stoppers 79 limit axial movement of the sprockets 19e on the external surface of sprocket support member 24 in a conventional manner.

The axially facing annular surface 76 and projections 77 together form a meshing surface to non-rotatably engage a meshing surface of hub body 22, as discussed in more detail below. More specifically, the projections 77 and annular axially facing surface 76 are sized and configured to non-rotatably engage a meshing surface of engagement member 26. The meshing surfaces are so dimensioned to overlap in a circumferential direction such that axial separation of engagement member 26 and sprocket support member 24 is prevented unless relative rotation occurs between sprocket support member 24 and engagement member 26, as also discussed below in more detail.

Figure 19:
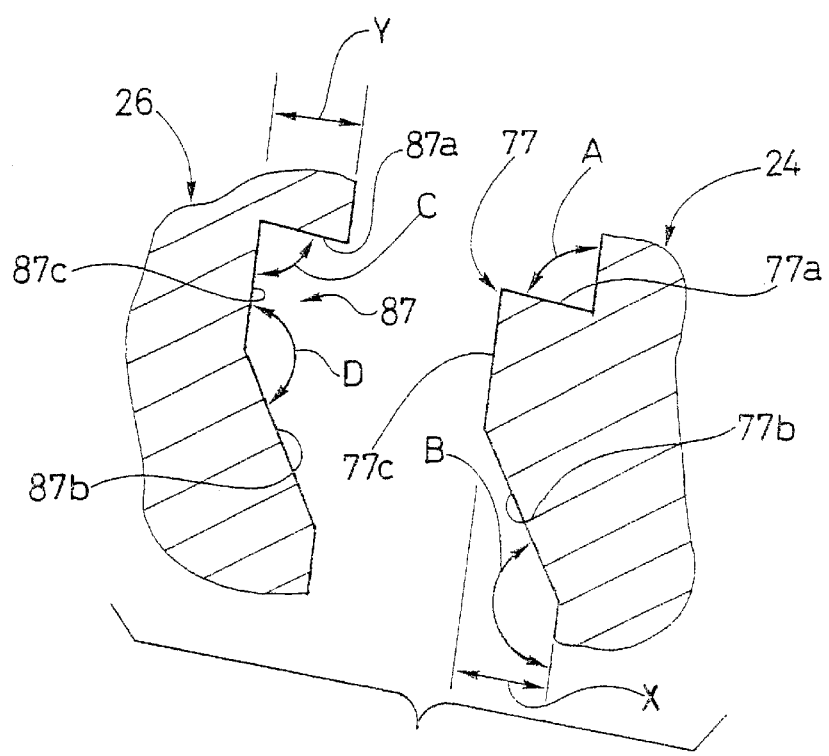
FIG. 19 is an enlarged, diagrammatic cross-sectional view of one projection of the sprocket support member and one recess of the engagement member prior to engagement with each other.

Referring still to FIGS. 2–9, projections 77 are circumferentially arranged around annular axially facing surface 76 and equally spaced from each other. Moreover, each projection 77 is preferably formed of a first angled surface 77a, a second angled surface 77b and an axial end surface 77c. The first and second angled surfaces 77a and 77b of each projection 77 are circumferentially spaced from each other and connected to each other by axial end surface 77c. Each axial end surface 77c is preferably substantially parallel to the annular axially facing surface 76. Moreover, each axial end surface is preferably axially spaced from axially facing surface 76 a distance X of approximately 2.5 mm, as seen in FIG. 19. In other words, projections 77 preferably have an axial thickness X of approximately 2.5 mm. Accordingly, projections 77 can be considered low profile projections. However, despite the so-called low profile of projections 77, positive non-rotatable engagement between engagement member 36 and sprocket support member 24 can be obtained.

Figure 8:
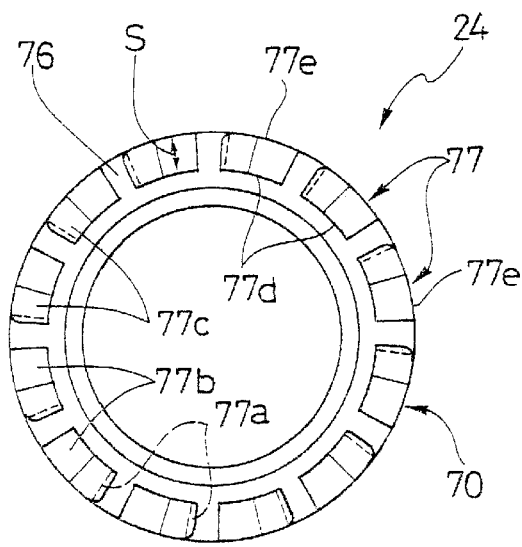
FIG. 8 is an end elevational view of the sprocket support member illustrated in FIG. 7.
Figure 9:
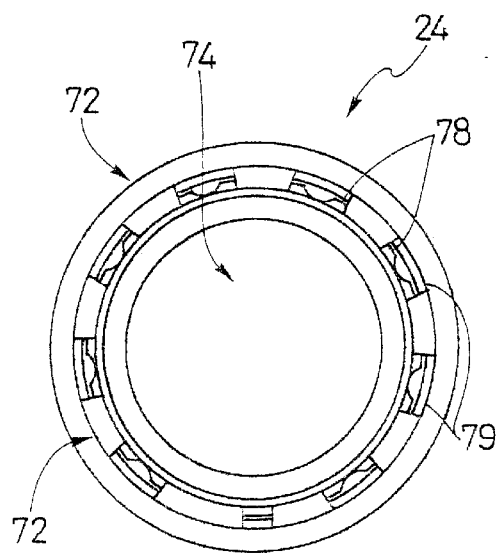
FIG. 9 is an opposite end elevational view of the sprocket support member illustrated in FIGS. 7 and 8.
Figure 10:
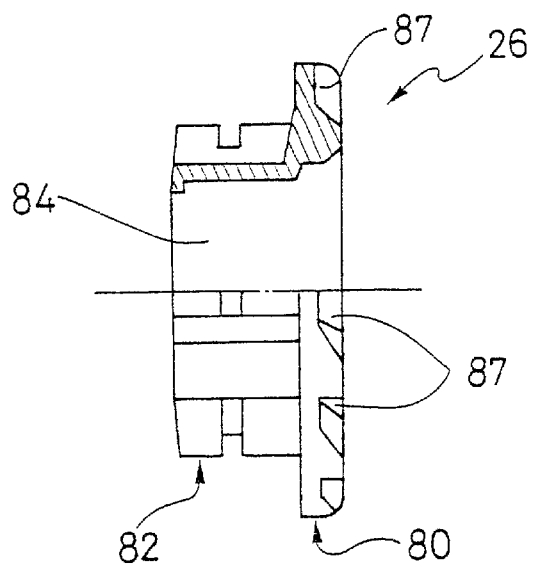
FIG. 10 is an enlarged, partial cross-sectional view of the engagement member of the hub body of the rear hub illustrated in FIGS. 2–6.
Figure 11:
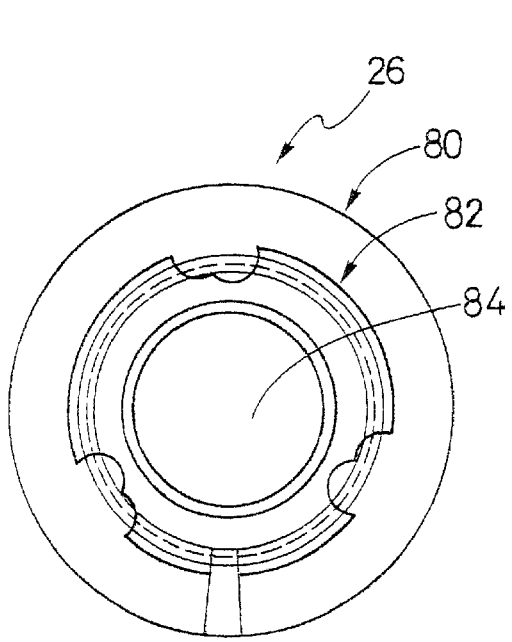
FIG. 11 is an end elevational view of the engagement member illustrated in FIG. 10.

Each projection 77 also preferably includes an inner circumferentially extending surface 77d and an outer circumferentially extending surface 77e. Inner circumferentially extending surface 77d is preferably substantially perpendicular to the axially facing surface 76. Outer circumferentially extending surface 77e is also preferably substantially perpendicular to axially facing surface 76 but includes a curved intersection surface between axial end surface 77c and outer circumferentially extending surface 77e. Inner and outer circumferentially extending surfaces 77d and 77e are preferably curved surfaces substantially concentric to each other (i.e. parallel cylindrical surfaces). Thus, each projection has a radial width S, as seen in FIG. 8.

The structure of the first and second angled surfaces 77a and 77b of projections 77 will now be discussed in more detail. Preferably, first angled surface 77a forms an acute angle A with axial surface 76, as seen in FIG. 19. Moreover, second angled surface 77b preferably forms an obtuse angle B with axial surface 76, as also seen in FIG. 19. Moreover, first and second angled surfaces 77a and 77b of each projection 77 are preferably arranged in the same orientation in the circumferential direction around engagement portion 70 of sprocket support member 24. In other words, first angled surfaces 77a are spaced circumferentially from respective second angled surface 77b of adjacent projections 77. Preferably the acute angle A between each first angled surface 77a and axial surface 76 is approximately 80 degrees, while the obtuse angle B formed between each second angled surface 77b and axial surface 76 is approximately 150 degrees. Thus, projections 77 extend slightly in a circumferential direction.

Referring to FIGS. 2–6 and 10–12, engagement member 26 will now be discussed in more detail. Engagement member 26 is preferably formed as a one-piece unitary member constructed of substantially hard, rigid material. For example, Engagement member 26 can be constructed of a lightweight metallic material such as aluminum or titanium or a slightly heavier material such as steel. Engagement member 26 is a tubular member and basically includes an engagement portion 80, a tubular portion 82 and a through bore 84. Tubular portion 82 extends axially from engagement portion 80 and forms part of one-way clutch 28, as discussed in more detail below. Through bore 84 is sized and configured such that inner tubular sleeve portion 52 and first portion 30 of hub axle 20 are freely rotatable therein.

Engagement portion 80 basically includes an annular axially facing surface 86 with a plurality of axially extending recesses 87 formed therein. Axially facing surface 86 and recesses 87 form a meshing surface sized and configured to mate with the meshing surface formed by projections 77 and axially facing surface 76 of sprocket support member 24. More specifically, the meshing surfaces (of engagement member 26 and sprocket support member 24) are so dimensioned to overlap in a circumferential direction such that axial separation of engagement member 26 and sprocket support member 24 is prevented unless relative rotation occurs between sprocket support member 24 and engagement member 26.

Recesses 87 are circumferentially arranged around annular axially facing surface 86 and equally spaced from each other. Moreover, each recess 87 is preferably formed of a complementary first angled surface 87a, a complementary second angled surface 87b and a complementary axial end surface 87c. The first and second angled surfaces 87a and 87b of each recess 87 are circumferentially spaced from each other and connected to each other by axial end surface 87c. Each axial end surface 87c is preferably substantially parallel to the annular axially facing surface 86. Moreover, each axial end surface 87c is preferably axially spaced from axially facing surface 86 a distance Y of approximately 2.5 mm, as seen in FIG. 19. In other words, recesses 87 preferably have an axial depth Y of approximately 2.5 mm. Accordingly, recesses 87 can be considered low profile recesses. However, despite the so-called low profile of projections 77 and recesses 87, positive non-rotatable engagement between engagement member 26 and sprocket support member 24 can be obtained.

Each recess 87 also preferably includes a third angled surface 87d extending radially inwardly from complementary axial end surface 87c to annular axially facing surface 86. In other words, recesses 87 do not include a complementary inner circumferentially extending surface designed to mate with surface 77d of projections 77. Moreover, third angled surface 87d extends circumferentially between the first and second angled surfaces 87a and 87b of each recess. Therefore, each recess 77 has a maximum radial width T larger than radial width S of each projection 77 and a minimum radial width substantially equal to the radial width S of each projection 77. In other words, each projection 77 has a substantially constant radial width, while recesses 87 have a varying radial width due to the structure of the third angled surfaces 87d.

Third angled surfaces 87d act as ramp surfaces (i.e. inclined planes) for guiding projections 77 when sprocket support member 24 is moved in a transverse direction relative to hub body 22. However, recesses 87 have substantially an identical cross section in the circumferential direction to the cross section of projections 77 in the circumferential direction as seen in FIG. 19. Therefore, engagement member 26 and sprocket support member 24 rotate together in either direction when projections 77 are completely received in recesses 87 (provided axial separation is limited), as discussed in more detail below.

In the illustrated embodiment, axial surface 86 and recesses 87 can be considered a first meshing surface, while axial surface 76 and projections 77 can be considered a second meshing surface. In other words, engagement member 26 has a first meshing surface facing in a first axial direction, and sprocket support member 24 has a second meshing surface facing in a second axial direction opposite the first axial direction.

Figure 12:
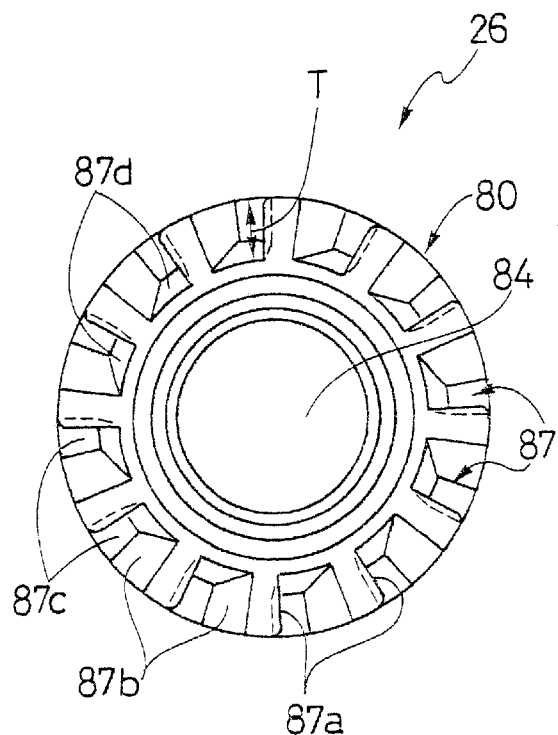
FIG. 12 is an opposite end elevational view of the engagement member illustrated in FIGS. 10 and 11.

Referring to FIGS. 7–12, the first and second angled surfaces 87a and 87b of recesses 87 are complementary to first and second angled surfaces 77a and 77b of projections 77 as mentioned above. Additionally, first angled surfaces 77a and 87a are inverted opposite surfaces, while second angled surfaces 77b and 87b are also inverted opposite surfaces, as discussed above. Moreover, the acute angled surfaces 77a and 87a are preferably arranged in a first circumferential orientation. In other words, angled surfaces 87a are arranged on a clockwise side of recesses 87 as seen in FIG. 12, while angled surfaces 77a are arranged on a counter-clockwise side of projections 77 as seen in FIG. 8. However, FIGS. 8 and 12 are opposite end elevational views of sprocket support member 24 and engagement member 26, respectively. Thus, angled surfaces 77a and 87a contact each other when sprocket support member 24 is engaged with engagement member 26.

Figure 17:
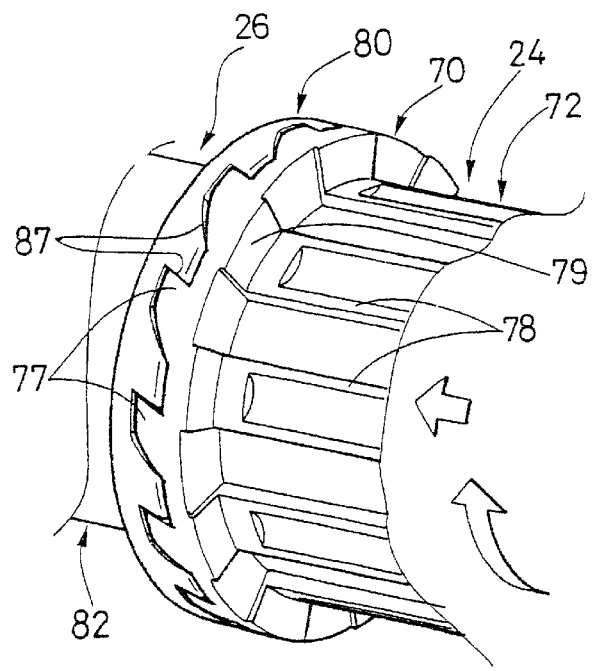
FIG. 17 is an enlarged, partial perspective view of the sprocket support member and engagement member illustrated in FIGS. 2–12 showing an engaged position.
Figure 18:
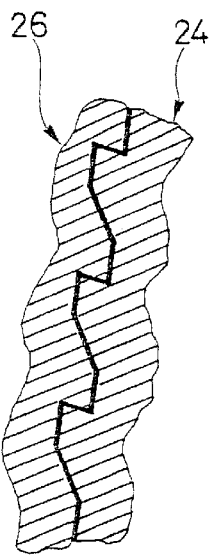
FIG. 18 is a diagrammatic cross-sectional view of the projections and recesses of the sprocket support member and engagement member illustrated in FIG. 17.

Referring to FIGS. 13–18, when sprocket support member is rotated in a positive direction (i.e. clockwise direction) relative to recesses 87, a tight connection in the clockwise direction can be obtained as seen in FIGS. 17 and 18. This clockwise direction can be considered a positive rotational direction of sprocket support member relative to hub body 22 (i.e. positive rotation of drive train 19). One way clutch 28 is oriented such that when engagement member 26 is rotated in the positive direction, outer tubular portion 50 of hub body 22 will also be rotated in the positive direction. On the other hand, if sprocket support member 24 is rotated in the negative direction (i.e. counterclockwise direction) as viewed in FIGS. 17 and 18, engagement member 26 will be freely rotatable in the negative direction relative to outer tubular portion 50. Thus, engagement member 26 will also rotate with sprocket support member in the negative direction.

One-way clutch 28 is relatively conventional and includes a pawl spring and three pawls (not shown) located 120° apart from each other on the pawl spring. One-way clutch 28 also includes portions of hub body 22 and engagement member 26. In particular, one-way clutch 28 includes an annular groove and three pawl seats of engagement member 26 and ratchet teeth of an outer tubular member 82. Outer tubular member 82 is threadedly coupled within recess 55 of outer tubular member 50 of hub body 22. The pawl spring is located within groove for securing the pawls in the pawl seats in a conventional manner. The pawls normally engage the ratchet teeth such that hub body 22 can rotate in one direction about the longitudinal axis but cannot rotate in the other direction in a conventional manner.

Figure 2:
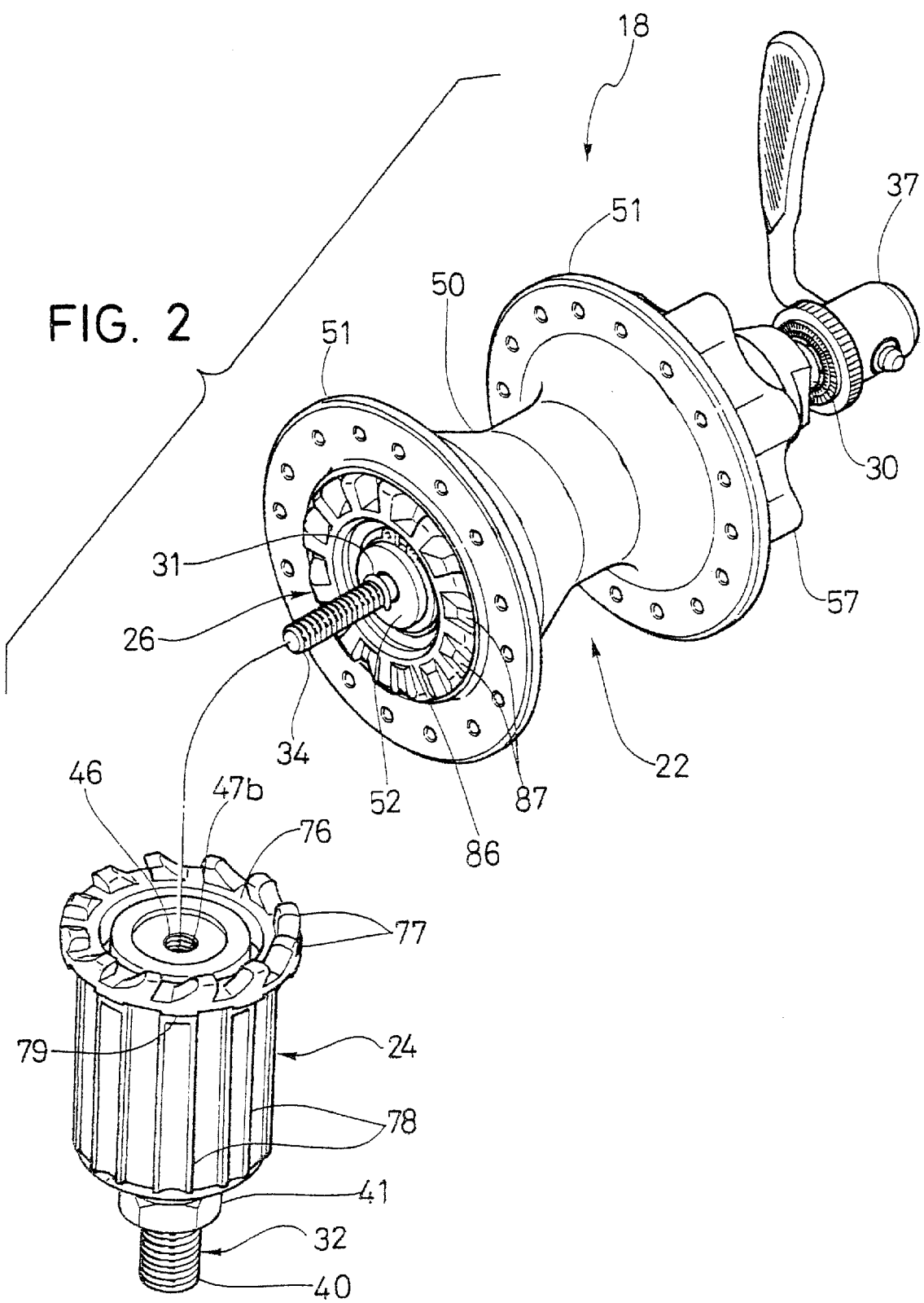
FIG. 2 is an enlarged, partially exploded perspective view of the rear bicycle hub illustrated in FIG. 1.

Assembly and operation of rear hub 18 will now be discussed in more detail. Hub body 22 is basically assembled with first portion 30 of hub axle 20 rotatably received therein, as seen in FIG. 2. Sprocket support member 24 is basically assembled with second portion 32 of hub axle 20. First portion 30 is then threadedly coupled to second portion 32 of hub axle 20 to non rotatably couple sprocket support member 24 to engagement member 26 of hub body 22. Rear hub 18 is then mounted to rear fork 15. Specifically, nut 41 is tightened and quick release 37 is closed to fixedly couple rear hub 18 to rear fork 15.

Figure 3:
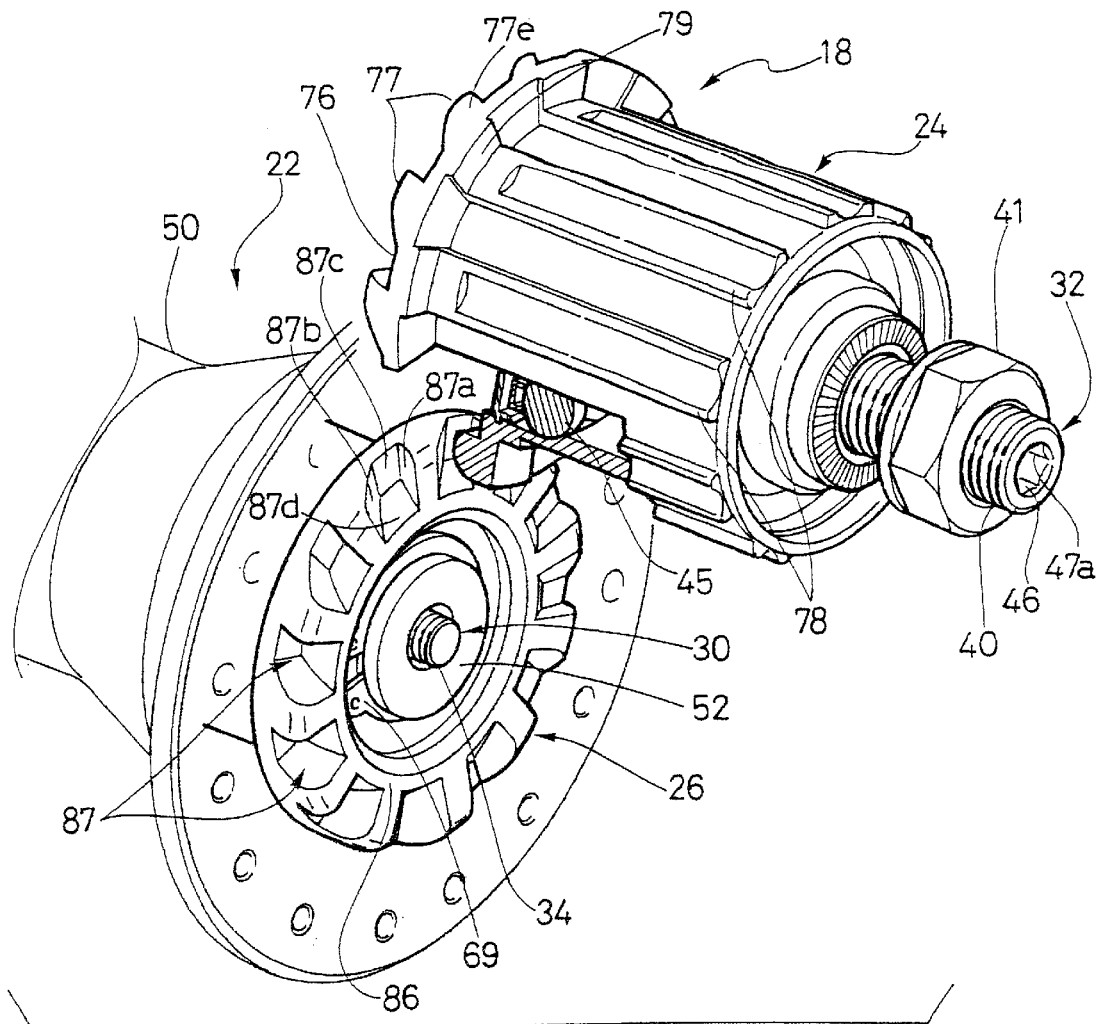
FIG. 3 is an enlarged, partially exploded, partial reverse perspective view of the hub illustrated in FIG. 2 with portions broken away to show the sprocket support member and engagement member prior to complete engagement.
Figure 4:
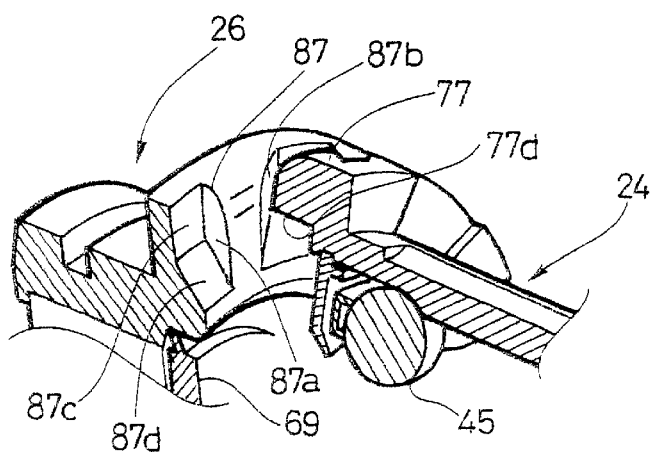
FIG. 4 is an enlarged, partial reverse perspective view of portions of the rear hub illustrated in FIGS. 2 and 3, with portions broken away to show engagement of the sprocket support member with the engagement member.

When rear hub 18 is installed on rear fork 15 of the bicycle 10, no axial space is provided between sprocket support member 24 and engagement member 26. Therefore, sprocket support member 24 and engagement member 26 will rotate together when hub 18 is installed on rear fork 15. In other words, engagement member 26 and sprocket support member 24 will remain in tight engagement with each other. However, if axial space is provided, second angled surfaces 77b and 87b, and third angled surface 87d can act as ramp surfaces for disengaging sprocket support member 24 from engagement member 26. However, sprocket support member 24 will not axial separate from engagement member 26 unless relative rotation occurs because of the acute angled surfaces 77a and 87a. Accordingly, when axial space is provided between rear fork 15 (when quick release 27 is released), hub body 22 can be moved in a transverse direction. The angled surfaces 77b, 87b and 87d will then cause the sprocket support member 24 to rotate relative to engagement member 26 such that hub body 22 can be removed from rear fork 15 without removing sprocket support member 24 from rear fork 15, as best seen in FIG. 4. These surfaces also act as ramp surfaces when hub body 22 is reinstalled as seen in FIG. 3.

The terms of degree such as "substantially", "about" and "approximately" as used herein mean a reasonable amount of deviation of the modified term such that the end result is not significantly changed. These terms should be construed as including a deviation of ±5% of the modified term if this would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A bicycle hub comprising:
    a hub axle having a first portion and a second portion releasably coupled to said first portion;
    a hub body having an outer tubular portion, a first engagement portion coupled to said outer tubular portion and an interior passageway with said first portion of said hub axle being rotatably supported therein, said first engagement portion formed with a first meshing surface; and
    a sprocket support member mounted on said second portion of said hub axle, said sprocket support member having a second engagement portion formed with a second meshing surface non-rotatably engaged with said first meshing surface, said first and second meshing surfaces being so dimensioned to overlap to prevent axial separation without relative rotation occurring between said first and second engagement portions,
    one of said first and second meshing surfaces having including a plurality of circumferentially arranged projections, each of said projections having a pair of non-parallel surfaces with outer ends spaced a first predetermined distance from each other and inner ends spaced a second predetermined distance from each other, each pair of non-parallel surfaces being inclined in the same direction and said second predetermined distance being larger than said first predetermined distance,
    the other of said first and second meshing surfaces including a plurality of circumferentially arranged mating recesses.

2. The bicycle hub according to claim 1, wherein said plurality of circumferentially arranged projections extend axially from a first annular axially facing surface and said circumferentially arranged mating recesses are formed in a second annular axially facing surface.

3. The bicycle hub according to claim 2, wherein each of said recesses has an axial depth substantially equal to an axial thickness of each of said projections.

4. The bicycle hub according to claim 3, wherein said axial thickness of each of said projections is about 2.5 millimeters.

5. The bicycle hub according to claim 2, wherein said second meshing surface is formed of said first annular axially facing surface with said plurality of circumferentially arranged projections extending therefrom and said first meshing surface is formed of said second annular axially facing surface with said plurality of circumferentially arranged recesses formed therein.

6. The bicycle hub according to claim 2, wherein each of said projections includes a first angled surface, a second angled surface circumferentially spaced from said first angled surface and an axial end surface connecting said first and second angled surfaces such that said first and second angled surfaces form said non-parallel surfaces.

7. The bicycle hub according to claim 6, wherein said axial end surfaces are substantially parallel to said first annular axially facing surface.

8. The bicycle hub according to claim 6, wherein each of said recesses has a complementary first angled surface, a complementary second angled surface and a complementary axial end surface connecting said complementary first and second angled surfaces.

9. The bicycle hub according to claim 8, wherein each of said projections includes an inner circumferentially extending surface substantially perpendicular to said first annular axially facing surface.

10. The bicycle hub according to claim 8, wherein one of said first and second angled surfaces is a planar surface that forms an acute angle with said first annular axially facing surface.

11. The bicycle hub according to claim 10, wherein said acute angle is approximately 80°.

12. The bicycle hub according to claim 10, wherein the other of said first and second angled surfaces is a planar surface that forms an obtuse angle with said first annular axially facing surface.

13. The bicycle hub according to claim 12, wherein said obtuse angle is approximately 150°.

14. The bicycle hub according to claim 12, wherein each of said projections includes an inner circumferentially extending surface substantially perpendicular to said first annular axially facing surface.

15. The bicycle hub according to claim 14, wherein each of said recesses includes a third angled surface extending radially inwardly from said complementary axial end surface to said second annular axially facing surface.

16. The bicycle hub according to claim 15, wherein said axial end surfaces of said projections and said complementary axial end surfaces are substantially parallel to said first and second annular axially facing surfaces.

17. The bicycle hub according to claim 1, wherein said first portion of said hub axle is threadedly coupled to said second portion of said hub axle.

18. The bicycle hub according to claim 1, wherein said sprocket support member is freely rotatably mounted on said second portion of said hub axle.

19. The bicycle hub according to claim 1, wherein
said hub body includes a one-way clutch coupling said first engagement portion to said outer tubular portion to form a freewheel.

20. The bicycle hub according to claim 1, wherein
said hub body includes a tubular inner sleeve portion rotatably coupled on said first portion of said hub axle.

21. The bicycle hub according to claim 20, wherein
said inner sleeve portion includes an internal enlarged section at a free end of said inner sleeve portion to form an internal abutment shoulder.

22. The bicycle hub according to claim 21, wherein
said first portion of said hub axle includes a retaining ring arranged thereon to prevent removal of said first portion of said hub axle from said inner sleeve portion.

23. The bicycle hub according to claim 1, wherein
said first portion of said hub axle includes a retaining ring releasably mounted thereon to retain said first portion of said hub axle in said hub body.

24. A bicycle hub comprising:
a hub axle having a first portion and a second portion releasably coupled to said first portion;
a hub body having an outer tubular portion, a first engagement portion coupled to said outer tubular portion and an interior passageway with said first portion of said hub axle being rotatably supported therein, said first engagement portion formed with a first meshing surface; and
a sprocket support member mounted on said second portion of said hub axle, said sprocket support member having a second engagement portion formed with a second meshing surface non-rotatably engaged with said first meshing surface, said first and second meshing surfaces being so dimensioned to overlap to prevent axial separation without relative rotation occurring between said first and second engagement portions,
one of said first and second meshing surfaces including a plurality of circumferentially arranged projections extending axially from a first annular axially facing surface and the other of said first and second meshing surfaces including a plurality of circumferentially arranged mating recesses formed in a second annular axially facing surface,
each of said recesses having a maximum radial width larger than a radial width of each of said projections and a minimum radial width substantially equal to said radial width of each of said projections.

25. A bicycle hub comprising:
a hub axle having a first portion and a second portion releasably coupled to said first portion;
a hub body having an outer tubular portion, a first engagement portion coupled to said outer tubular portion and an interior passageway with said first portion of said hub axle being rotatably supported therein, said first engagement portion formed with a first meshing surface; and
a sprocket support member mounted on said second portion of said hub axle, said sprocket support member having a second engagement portion formed with a second meshing surface non-rotatably engaged with said first meshing surface, said first and second meshing surfaces being so dimensioned to overlap to prevent axial separation without relative rotation occurring between said first and second engagement portions,
one of said first and second meshing surfaces including a plurality of circumferentially arranged projections extending axially from a first annular axially facing surface and the other of said first and second meshing surfaces including a plurality of circumferentially arranged mating recesses formed in a second annular axially facing surface,
each of said projections including a first angled surface, a second angled surface circumferentially spaced from said first angled surface and an axial end surface connecting said first and second angled surfaces,
each of said recesses having a complementary first angled surface, a complementary second angled surface and a complementary axial end surface connecting said complementary first and second angled surfaces,
each of said recesses including a third angled surface extending radially inwardly from said complementary axial end surface to said second annular axially facing surface.

26. The bicycle hub according to claim 25, wherein
each of said projections includes an inner circumferentially extending surface substantially perpendicular to said first annular axially facing surface.

27. The bicycle hub according to claim 25, wherein
one of said first and second angled surfaces forms an acute angle with said first annular axially facing surface.

28. The bicycle hub according to claim 27, wherein
the other of said first and second angled surfaces forms an obtuse angle with said first annular axially facing surface.

29. The bicycle hub according to claim 28, wherein
each of said projections includes an inner circumferentially extending surface substantially perpendicular to said first annular axially facing surface.

30. The bicycle hub according to claim 29, wherein
said axial end surfaces of said projections and said complementary axial end surfaces are substantially parallel to said first and second annular axially facing surfaces.

31. The bicycle hub according to claim 25, wherein
said axial end surfaces of said projections and said complementary axial end surfaces are substantially parallel to said first and second annular axially facing surfaces.

32. A bicycle hub comprising:
a hub axle having a first portion and a second portion releasably coupled to said first portion;
a hub body having an outer tubular portion, a first engagement portion coupled to said outer tubular portion and an interior passageway with said first portion of said hub axle being rotatably supported therein, said first engagement portion formed with a first meshing surface; and
a sprocket support member mounted on said second portion of said hub axle, said sprocket support member having a second engagement portion formed with a second meshing surface non-rotatably engaged with said first meshing surface, said first and second meshing surfaces being so dimensioned to overlap to prevent axial separation without relative rotation occurring between said first and second engagement portions
one of said first and second meshing surfaces including a plurality of circumferentially arranged projections extending axially from a first continuous annular axially facing surface and the other of said first and second meshing surfaces including a plurality of circumferentially arranged mating recesses formed in a second continuous annular axially facing surface, said first and second annular axially facing surfaces contacting each other to form a continuous annular contact area between said first and second engagement portions when said sprocket support member is coupled to said hub body.

33. A bicycle hub comprising:

a hub axle having a first portion and a second portion releasably coupled to said first portion;

a hub body having an outer tubular portion, a first engagement portion coupled to said outer tubular portion and an interior passageway with said first portion of said hub axle being rotatably supported therein, said first engagement portion formed with a first meshing surface; and a sprocket support member mounted on said second portion of said hub axle, said sprocket support member having a second engagement portion formed with a second meshing surface non-rotatably engaged with said first meshing surface, said first and second meshing surfaces being so dimensioned to overlap to prevent axial separation without relative rotation occurring between said first and second engagement portions, said first portion of said hub axle being slideably retained within said interior passageway of said hub body for a limited range of axial movement when said sprocket support member is detached from said hub body so that said first portion of said hub axle is retracted within said interior passageway of said hub body.

34. The bicycle hub according to claim 33, wherein said first portion of said hub axle includes a retaining ring releasably mounted thereon to retain said first portion of said hub axle in said hub body.

* * * * *